United States Patent [19]
Steinkirchner

[11] Patent Number: 5,392,365
[45] Date of Patent: Feb. 21, 1995

[54] APPARATUS FOR DETECTING TEXT EDGES IN DIGITAL IMAGE PROCESSING

[75] Inventor: James J. Steinkirchner, Brockport, N.Y.

[73] Assignee: Eastman Kodak Company, Rochester, N.Y.

[21] Appl. No.: 812,666

[22] Filed: Dec. 23, 1991

[51] Int. Cl.⁶ ............................................. G06K 9/48
[52] U.S. Cl. ..................................... 382/22; 382/50; 358/462; 358/538
[58] Field of Search ............................ 382/22, 50, 51; 358/453, 456, 462, 466, 534, 538; H04N 1/40, 1/46

[56] References Cited

U.S. PATENT DOCUMENTS

| H 681 | 9/1989 | Weideman | 382/11 |
|---|---|---|---|
| 4,691,366 | 9/1987 | Fenster et al. | 382/54 |
| 4,856,075 | 8/1989 | Smith | 382/50 |
| 4,862,283 | 8/1989 | Smith | 358/443 |
| 4,899,225 | 2/1990 | Sasuga et al. | 358/448 |
| 4,930,007 | 5/1990 | Sugiura et al. | 358/75 |
| 4,953,012 | 8/1990 | Abe | 358/75 |
| 4,953,013 | 8/1990 | Tsuji et al. | 358/75 |
| 4,984,283 | 1/1991 | Sakano | 382/28 |
| 5,014,124 | 5/1991 | Fujisawa | 358/75 |
| 5,134,667 | 7/1992 | Suzuki | 382/22 |
| 5,189,523 | 2/1993 | Sugiura et al. | 358/300 |

*Primary Examiner*—David K. Moore
*Assistant Examiner*—Andrew W. Johns
*Attorney, Agent, or Firm*—Norman Rushefsky

[57] ABSTRACT

Apparatus for detecting edges of black text in an original image. An edge detector which low pass filters the image signal to blur and widen any edges in the original image, and then high pass filters the low pass filtered signal to produce a first output signal which represents the blurred edges in the original image. The non-edge blurred signal is high pass filtered to produce a second output signal which represents the non-blurred edges in the original image. The first and second output signals are combined to create a first edge control signal that encompasses any edges in the original image. Halftone areas of the original image are identified by detecting dots in the original image, a second edge control signal that excludes areas in the original image identified as containing dots is created. Color pixels in the original image are detected, and a neutral color signal that represents the non-color portions of the original image is created. The first edge control signal, the second edge control signal, and the neutral color signal are combined to create a black text edge control signal that encompasses edges in the original image not in an area that contains dots.

14 Claims, 8 Drawing Sheets

FIG. 3
| LOW PASS KERNEL | HIGH PASS KERNEL |
|---|---|
| | -1 -1 -1 -1 -1 |
| 1 1 1 | -1 -1 -1 -1 -1 |
| 1 8 1 | -1 -1 24 -1 -1 |
| 1 1 1 | -1 -1 -1 -1 -1 |
| | -1 -1 -1 -1 -1 |
2 point—
4 point—
6 point—
18 point— ABCDEFGH
36 point— ABCD
133 Line Screen
65 Line Screen
FIG. 4

2 point—
4 point— ABCDEFGHIJKLMNOPQRSTUVWXabcdefghijklmn
6 point— ABCDEFGHIJKLMNOPQRSTUVWX
18 point— ABCDEFGH
36 point— ABCD

133 Line Screen

65 Line Screen 2 point—
4 point—
6 point—
18 point— ABCDEFGH
36 point— ABCD

APPARATUS FOR DETECTING TEXT EDGES IN DIGITAL IMAGE PROCESSING

BACKGROUND OF THE INVENTION

1. Technical Field

This invention relates generally to digital copiers (either black and white or color), and more particularly to dynamically determining the edges of text in images to improve image quality by applying appropriate processing operations.

2. Background Art

Original document images to be reproduced by digital copiers can be grouped into six primary image types: color text, color halftones, color continuous tones, neutral (black and white) text, neutral halftones, and neutral continuous tones. Often times there is a mix of these different image types on the same original document.

Various known image processing algorithms are used to convert the scanned digital information (typically 8-bit signals) to a printable format (typically one-bit to four-bit signals). In order to achieve the best image quality, different image processing algorithms need to be used as a function of input image type. Documents having mixed image types present a need to dynamically select appropriate algorithms as a function of image type within a document.

Recent systems for dynamically determining image types are disclosed in commonly assigned U.S. Pat. Nos. 4,856,075 and No. 4,862,283, which issued to Craig M. Smith on Aug. 8 and Aug. 29, 1989, respectively. Although these systems worked well for their intended purposes, the single bit thresholding algorithm which was selected when the algorithm determined the pixels were text pixels did not do as good a job on the edges of characters as does the present invention.

Also inherent in high speed color marking engines is a finite plane-to-plane registration problem within a document with respect to the laydown of different toners. Both these image quality issues are very noticeable in areas of input documents that contain black text.

A system that performs an edge enhancement on only black text within an image is used in the Canon CLC-500 Color Digital Copier. Canon's approach to detecting halftones is to count transitions over a two dimensional area. If the number of transitions is above a certain value, it is assumed to be halftone. This approach is susceptible to errors in small text, resulting in the screening of small characters. Further, the Canon approach cannot detect low frequency halftones. Large characters will also have their edges screened, and gray areas will tend to have dark edges around them.

DISCLOSURE OF INVENTION

It is an object of the present invention to provide a unique approach to detect halftones, which is less prone to errors, by searching for dots in the original image.

It is another object of the present invention to provide an approach to enhancing character edges which operates regardless of character size.

It is another object of the present invention to provide an approach to enhancing character edges wherein the edge width is adjustable. By first blurring the edge of a character, and then combining the blurred edge with a non-blurred edge, a wider edge is obtained.

It is another object of the present invention to provide an approach to enhancing character edges that is not susceptible to video noise.

It is another object of the present invention to provide an approach to enhancing character edges wherein area operations are implemented in the binary world so as to reduce line storage requirements and pin count with respect to the hardware implementation.

It is another object of the present invention to provide an approach to enhancing character edges that avoids putting dark edges around light flat fields.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is a representation of kernel values used during filtering in the edge recognition apparatus of FIG. 1;

FIG. 4 shows an image after edge detection by the detector of FIG. 2;

BEST MODE FOR CARRYING OUT THE INVENTION

Figure 1:
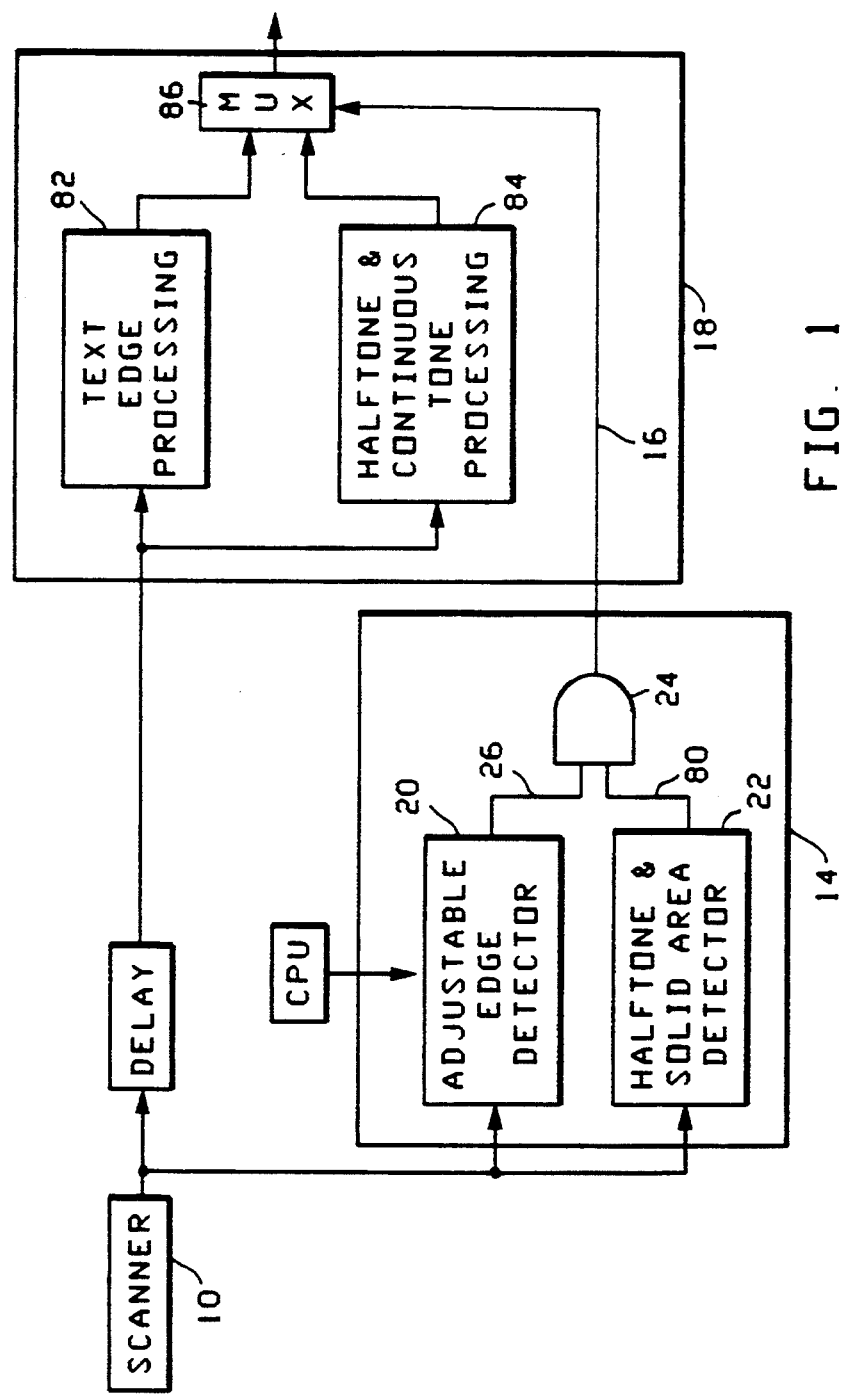
FIG. 1 is a block diagram showing a text edge recognition apparatus according to a preferred embodiment of the present invention.

FIG. 1 illustrates an embodiment of the present invention relating to monochromatic copiers and printers, or to color copiers and printers being used in a monochromatic mode. A color copier or printer embodiment will be described in a subsequent portion of this specification.

A scanner 10 produces a multiple-bit signal characteristic of the image content of an original document. The image signal which (for purposes of example) is, say, eight bits per pixel, is directed to a text edge recognition block 14. The goal of the text edge recognition block is to create a single-bit control signal 16 that encompasses the edges of text. The control signal can be used by a image processor 18 to dynamically switch between image processing algorithms.

Text edge recognition block 14 includes an adjustable edge detection means 20 and a halftone and solid area detection means 22. Detection means 20 and 22 provide two specific functions which are combined (logically AND'ed) at a gate 24 to create binary text edge control signal 16.

Adjustable edge detection means 20 finds all the edges in the image. It can be adjusted to produce an output 26 upon the detection of edges which can have widths from about, say, two pixels to four pixels.

Figure 2:
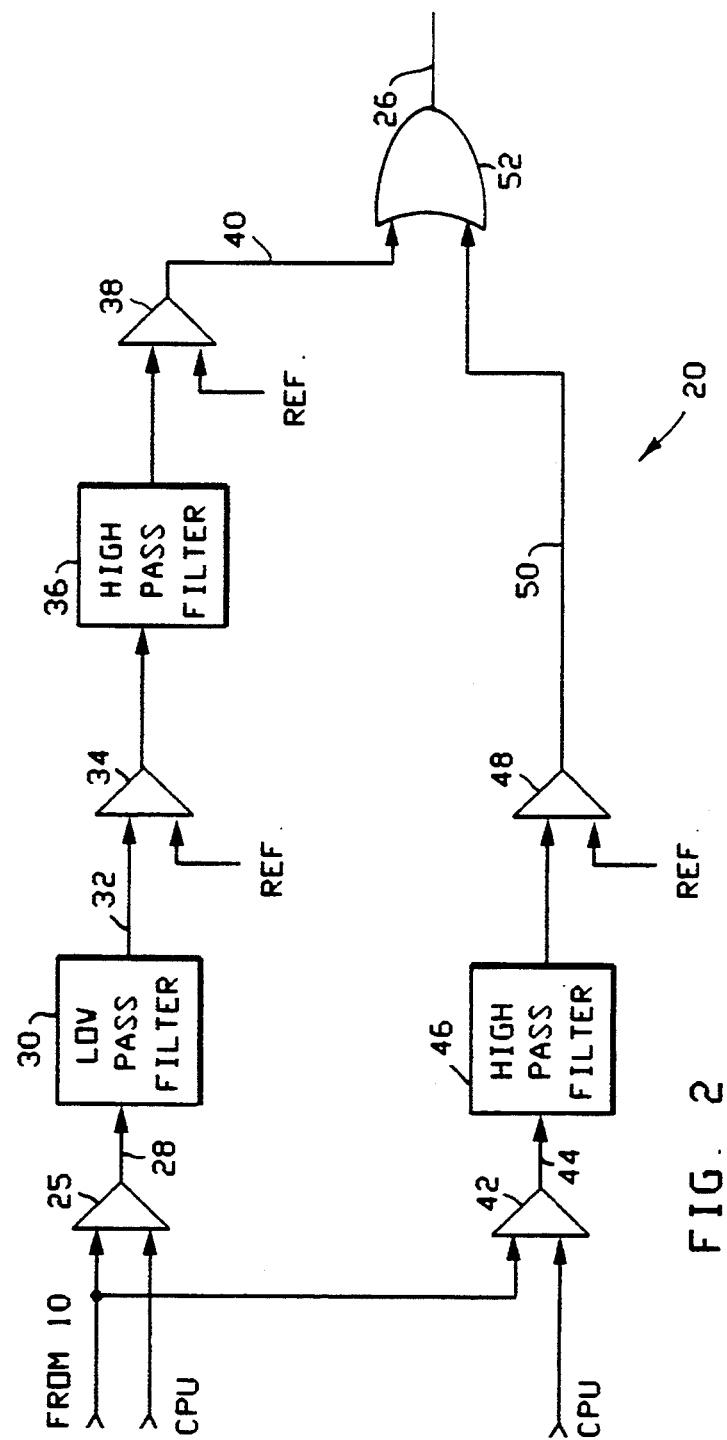
FIG. 2 is a detailed view of an adjustable edge detector, which is a part of the text edge recognition apparatus of FIG. 1.

Adjustable edge detection means 20 of FIG. 1 is shown in greater detail in FIG. 2. The eight-bit image signal from scanner 10 is compared at a thresholder 25 with a CPU-programmable value. The resulting value 28 is a single bit serial representation of the image. This single bit signal is then low pass filtered at 30, removing noise from the image and blurring (therefore widening) the edges of characters. The result 32 of the low pass filtering process is then thresholded at 34 and high pass filtered at 36 in order to detect edges, with the result thresholded at 38 to create a single bit representation 40.

Operating in parallel to low and high pass filters of 30 and 36, the image signal from scanner 10 is compared to another CPU-programable value at a thresholder 42. The resulting single-bit signal 44 is high pass filtered at 46 to detect edges, this time without blurring. The filtered result is thresholded at 48 to create a single-bit signal 50.

Now, the system has provided a signal 50 which represents the edges in the original image without blurring, and another signal 40 which represents the edges in the original image with blurring. The two signals 50 and 40 are logically OR'ed at 52 to obtain a wider edge than could be obtained with just a single high pass filter. The respective kernels for the high and low pass filters are shown in FIG. 3. The additional path through the low pass filter and high pass filter, and the subsequent OR'ing function, increases the edge width from a one or two pixel-wide edge to a three or four pixel-wide edge. The resultant signal 26 is represented as an image as shown in FIG. 4.

Unfortunately, the edge detector finds edges in all image types (text, halftones, and continuous tones). Accordingly, halftone and solid area detection means 22 is provided for removing the halftones and solid areas within halftone. Thus, the logical AND'ing of the outputs of detectors 20 and 22 results in a signal 16 which is asserted only when a pixel is a text edge.

Figure 5:
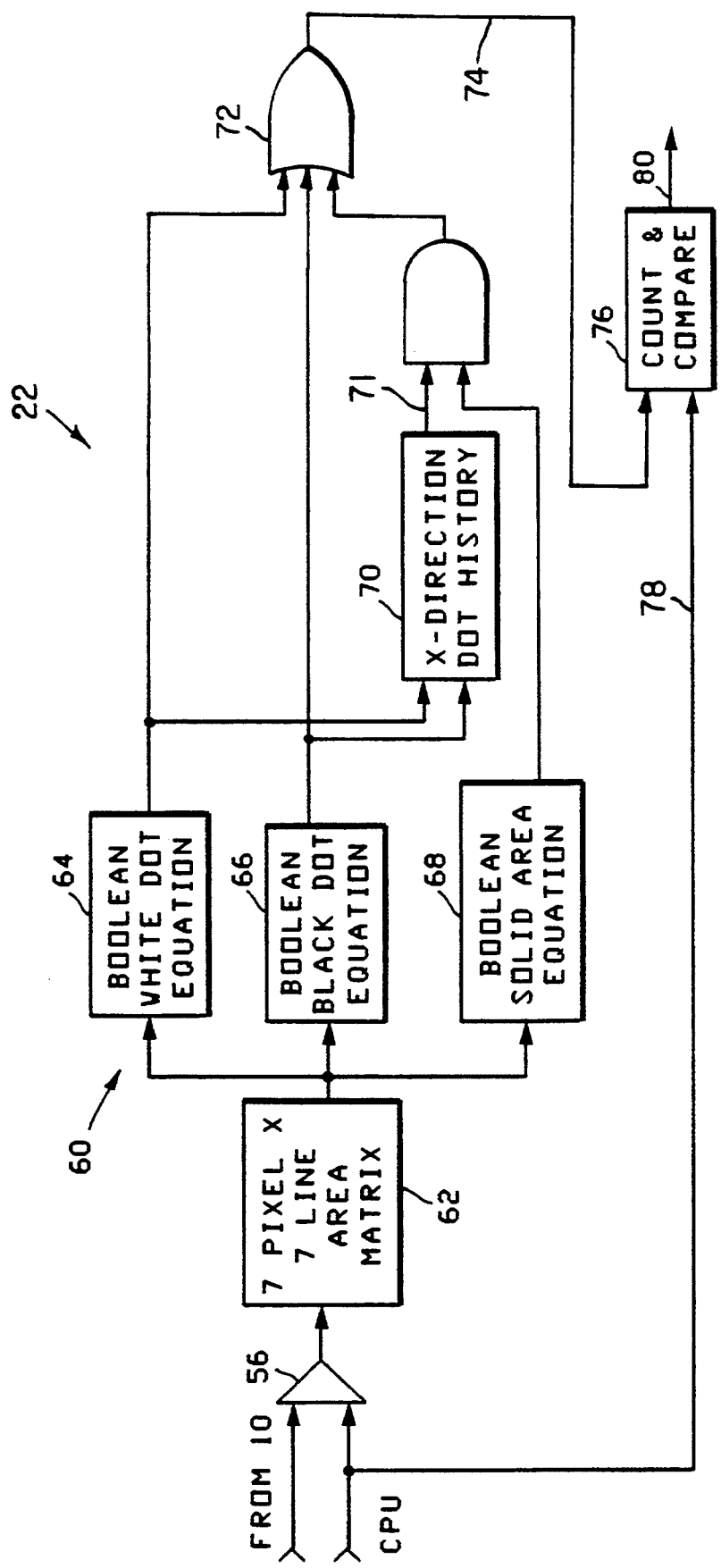
FIG. 5 is a detailed view of a halftone and solid area detector, which is a part of the text edge recognition apparatus of FIG. 1.
Figure 6:
FIG. 6 shows an image after a preliminary operation of the halftone and solid area detector of FIG. 5.
Figure 6:

Halftone and solid area detector 22 of FIG. 1 is shown in greater detail in FIG. 5. The 8-bit image signal from scanner 10 is compared to a CPU programmable value signal at a thresholder 56. The resulting value on output 58 is a single bit representation of the image. This resultant value is shown in image format in FIG. 6, and is inputted to a dot and solid area detection block 60. Thresholder 56 saves hardware by enabling further operations with a single-bit signal, rather than the eight-bit signal of the input image signal.

Dot and solid area detection block 60 consists of, say, a 7-pixel by 7-line single bit area matrix 62 that operates on the center pixel. The values of the forty nine positions in the matrix enter all three boolean equation logic blocks 64, 66, and 68; which respectively look for white dots, black dots, and solid areas. Dots are looked for to distinguish halftone areas from text areas, as text has very few dots while halftone images are full of dots. Solid areas are found near dots or near other solids are identified so as to not hollow out the inside of text areas.

The definition of a black dot, expressed as a boolean expression is as follows:

$$!P_{44} \cdot (P_{14} + P_{24} + P_{34}) \cdot (P_{54} + P_{64} + P_{74}) \cdot (P_{41} + P_{42} + P_{43}) \cdot (P_{45} + P_{46} + P_{47}) \cdot$$
$$(P_{11} + P_{22} + P_{33} + (P_{21} \cdot P_{12}) + (P_{31} \cdot P_{13})) \cdot$$
$$(P_{17} + P_{26} + P_{35} + (P_{16} \cdot P_{27}) + (P_{15} \cdot P_{37})) \cdot$$
$$(P_{55} + P_{66} + P_{77} + (P_{76} \cdot P_{67}) + (P_{75} \cdot P_{57})) \cdot$$
$$(P_{53} + P_{62} + P_{71} + (P_{61} \cdot P_{72}) + (P_{51} \cdot P_{73}))$$

The ! indicates a logical NOT, the + indicates a logical OR, the · indicates a logical AND. The subscripts represent locations of pixels within the matrix.

The definition of a white dot is the same as that of the black dot, however all elements are the logical NOT. The definition of a solid area is all 49 pixels ON.

Figure 7:
FIG. 7 shows an image after a dot and solid area detection operation of the halftone and solid area detector of FIG. 5.
Figure 7:
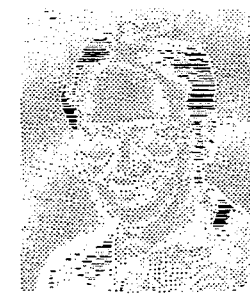

A cross-direction history block 70 restricts the solid area detection to within half-tones by producing a HIGH on line 71 only if the pixel of interest is close to a dot. For example, block 70 could contain a one-dimensional pixel store of, say, ten pixels on either side of the pixel of interest. If any of the stored pixels is identified as being a dot by equation 64 or 66, the output on line 71 is HIGH. Otherwise, the output on line 71 will be LOW. In other words, only solid areas near either (1) previously found dots or (2) other solid areas are considered to be solid areas. This allows for large solid areas within half-tone portions of the image to be seen as dots. The outputs of these expressions are logically OR'ed at a gate 72 to produce a single-bit output 74. The resultant output is shown in FIG. 7 in an image format. Observe that the text information has few dots, and the halftones have many dots.

Figure 8:
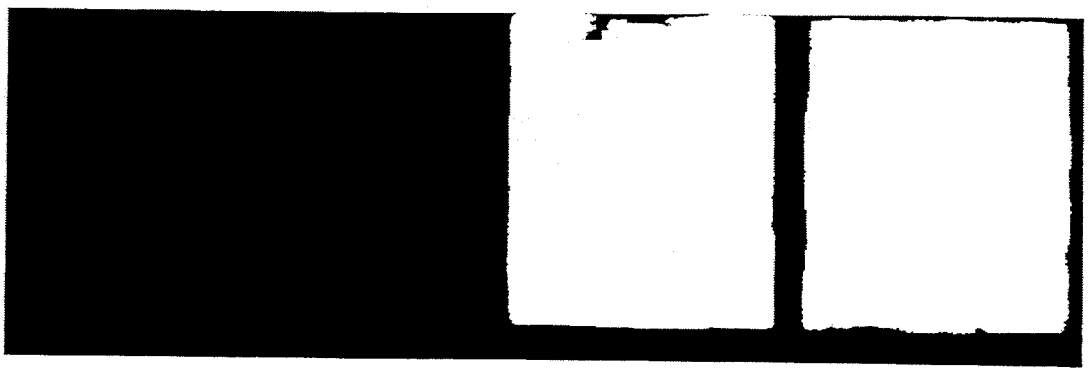
FIG. 8 shows an image after halftone and solid area detection by the detector of FIG. 5.

The output of dot and solid area detection block 60 is inputted to a count and compare block 76 which counts pixels that are either white dots, black dots or solid areas within halftones. This count takes place over a 33-pixel by 33-line area, the center pixel being the pixel operated on. If the count exceeds a certain CPU programmable value on input 78, the pixel being operated on is considered to be part of a halftone. Otherwise, it is not considered part of a halftone. The result is represented as a single bit output 80. It is represented in image format in FIG. 8, wherein black represents pixels that are not halftones, white represents pixels that are halftones.

Figure 9:
FIG. 9 shows an image after text edge recognition according to the present invention.

FIG. 9 illustrates the image resulting from control signal 16 of FIG. 1. The resulting signal displayed in FIG. 9 has eliminated the majority of the halftone information. This control signal can be used in subsequent image processor 18.

In a black-and-white digital copier according to this embodiment of the invention, the center portion of text is usually very high density. Thus, processing high density (solid) information with any type algorithm would not result in poor image quality. However, the edges of the text contain gray information. If that part of the text were to be half tone screened, it would result in poor image quality with respect to text.

Referring back to FIG. 1, text edge signal 16 is used to dynamically select from the output of either a text edge processing algorithm 82 when the text edges are encountered, or from a halftone photo processing algorithm 84 by a multiplexer 86.

Figure 10:
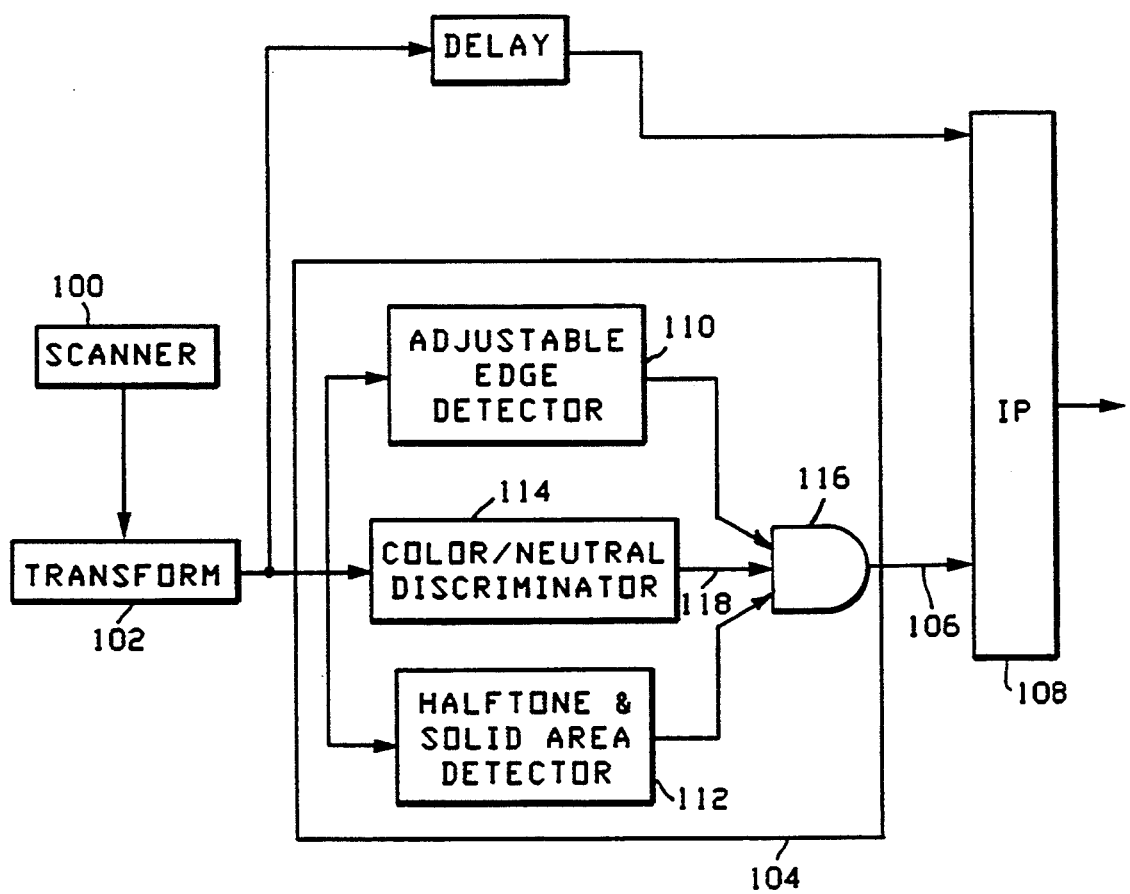
FIG. 10 is a block diagram showing a text edge recognition apparatus according to another preferred embodiment of the present invention.

FIG. 10 illustrates an embodiment of the present invention relating to color copiers and printers. A color scanner 100 produces a multiple-bit color signal characteristic of the red, green, and blue content of an original document. The color image signal, which (for purposes of example) is, say, eight bits per color pixel is converted from R, G, B color space to a color space uniform with respect to human visual response. In the illustrated example, a converter 102 transforms the color signal to Luv or Lab color space. That is, the color signal is converted to a luminance and two chrominance signals, each signal being eight bits wide.

The signal from converter 102 is directed to a black text edge recognition block 104, which addresses the image quality issue in areas of the input image that contain black text. The goal of the black text edge recognition block is to create a single-bit control signal 106 that encompasses the edges of only black text. The control signal can be used by subsequent image processor 108 in color digital copiers and printers to effect under color removal at the edges of black text so that black toner is used rather than process black (cyan, magenta and yellow toner) on the edges of black text.

Black text edge recognition block 104 of FIG. 10 is shown as including an adjustable edge detection means 110 and a halftone and solid area detection means 112, both fully described with respect to the embodiment of FIGS. 1-9 hereof. Black text edge recognition block 104 also includes a color/neutral discrimination means 114. The three specific functions 110, 112, and 114 are combined (logically AND'ed) at a gate 116 to create binary black text edge control signal 106.

Color/neutral discrimination means 114 discriminates between color and neutral images. It produces an output 118 only for pixels that are seen as neutral, thus removing color text, halftones, and photographs from output 106. Thus, after combining all inputs, the output of AND gate 106 would be a signal which is asserted only when a pixel is a neutral text edge.

Color/neutral discriminator 114 of FIG. 10 distinguishes color from neutral pixels. Its function is to eliminate all color images from signal 106. Since the scanned red, green and blue image signal has been transformed into some uniform color space such as Luv or Lab, the image information for each pixel entering black text edge recognition block 104 is represented as a triplet, with one element containing luminance information and the other two elements containing chrominance information.

The area centered around the origin of the chrominance plane (the ab plane in the Lab coordinate system, or the uv plane in the Luv coordinate system) contains the neutrals (little or no saturation), with saturation increasing as the radial distance from the origin.

Color/neutral discriminator 114 takes advantage of these attributes of the color coordinate systems to distinguish color from neutral. By looking at each pixel, or the average of a small area of pixels, the color neutral discriminator determines if the saturation of the chrominance of a pixel or pixels is within some programmable threshold.

Figure 11:
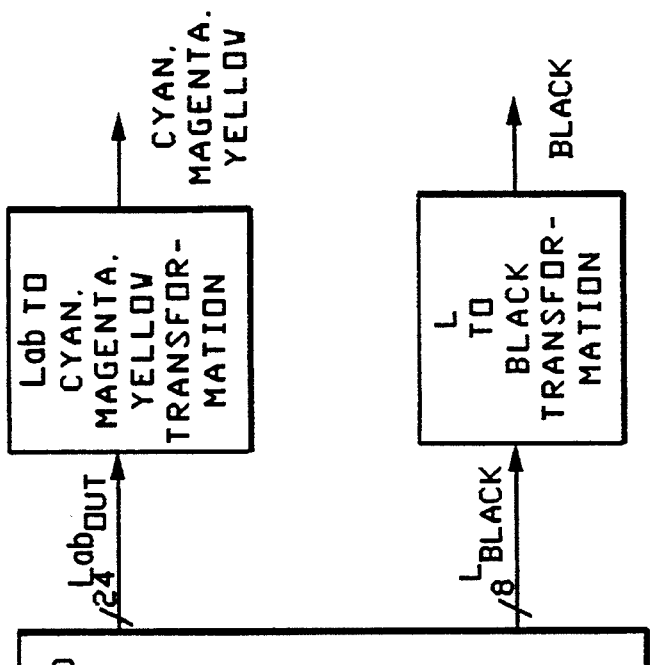
FIG. 11 is a schematic view of an under color removal function useful in the text edge recognition apparatus according to FIG. 10.

In color digital copiers, black text edge signal 106 is used as part of an under color removal function shown in FIG. 11. This guarantees that only a single toner (as opposed to process black) is used at the edges of characters, masking out potential registration problems in the print engine.

The present invention improves upon several of the weaknesses found in previous Dynamic Image Detection Algorithms and Black Text Enhancement algorithms. It avoids the susceptibility to video noise in the luminance information by employing a low pass filter in the edge detection function. It also makes decisions on a pixel basis rather than an area basis which avoids amplification of noise. The present invention uses a pattern recognition approach to detect halftones by searching for dots; making it very versatile over a large range of halftone frequencies and densities and minimizing the mistakes it makes in halftones. This same approach at detecting half tones makes it immune to any dependency of character size, in that the edges of even large size characters can be enhanced. If the control signal is used in conjunction with a multibit thresholding algorithm (as opposed to a single bit), the problem of dark edges around light flat fields is avoided.

The invention has been described in detail with particular reference to preferred embodiments thereof, but it will be understood that variations and modifications can be effected within the spirit and scope of the invention.

What is claimed is:

1. An edge detector for digital image processing apparatus, said edge detector comprising:
   means for inputting a digital signal representative of an original image;
   edge blurring means for sequentially low pass filtering the inputted signal to blur and widen any edges in the original image;
   means for high pass filtering the low pass filtered signal to produce a first output signal which represents the edges of the blurred original image;
   non-edge blurring means for high pass filtering the inputted signal to produce a second output signal which represents the non-blurred edges in the original image; and
   means for combining the first and second output signals to create a text edge control signal that encompasses any edges in the image represented by the inputted digital signal.

2. An edge detector as set forth in claim 1 wherein said means for combining the first and second output signals logically OR's the two output signals.

3. An edge detector as set forth in claim 1 further comprising means for thresholding the inputted signal before low and high pass filtering, whereby hardware requirements are minimized.

4. An edge detector as set forth in claim 1 wherein the inputted signal is a multiple-bit digital signal, and said edge detector further comprises means for converting the inputted digital signal to a single bit representation of the image before it is applied to said edge blurring means and said non-edge blurring means.

5. Apparatus for detecting edges of text in an original image, said apparatus comprising:
   A. input means for providing a digital signal representative of an original image;
   B. an edge detector having:
      a) edge blurring means for sequentially low pass filtering a provided digital signal to blur and widen any edges in the original image,
      b) means for high pass filtering the low pass filtered signal to produce a first output signal which represents the edges of the blurred original image,
      c) non-edge blurring means for high pass filtering the provided signal to produce a second output signal which represents the non-blurred edges in the original image, and
      d) means for combining the first and second output signals to create a first edge control signal that encompasses any edges in the original image;
   C. a half tone area detector having:

a) means for identifying halftone areas of the original image by identifying those areas of the original image that contain dots, and b) means for creating a second edge control signal that excludes areas in the original image identified as containing dots; and D. means for combining said first and second edge control signal to create a text edge control signal that encompasses edges in the original image not in an area that contains dots.

6. Apparatus for detecting edges of text in an original image as defined in claim 5, wherein said half tone area detector further comprises:

means for identifying solid areas found near dots in the original image; and means for excluding from said second edge control signal, those areas in the original image that contain solid areas near dots.

7. Apparatus for detecting edges of text in an original image as defined in claim 5, further comprising:

means for processing said digital signal with one of a plurality of image processing techniques, one of which is particularly suitable for processing text edges; and means responsive to said text edge control signal for selecting said one image processing technique.

8. A black edge detector for digital color image processing apparatus, said edge detector comprising:

input means for providing a digital signal representative of an original image;

edge blurring means for sequentially low pass filtering the provided signal to blur and widen any edges in the original image;

means for high pass filtering the low pass filtered signal to produce a first output signal which represents the edges of the blurred original image;

non-edge blurring means for high pass filtering the inputted signal to produce a second output signal which represents the non-blurred edges in the original image;

means for combining the first and second output signals to create a text edge control signal that encompasses any edges in the image represented by the provided digital signal;

means for discriminating between color pixels and neutral pixels in the provided signal to produce a neutral color signal that represents the non-color portions of the original image; and means for combining the text edge control signal and the neutral color signal to create a black text edge control signal.

9. A black edge detector as defined in claim 8 further comprising:

means for processing said digital signal with one of a plurality of image processing techniques, one of which is particularly suitable for processing text edges; and means responsive to said black text edge control signal for selecting said one image processing technique.

10. A black edge detector as defined in claim 8 further comprising:

means for using said digital signal to print an image selectively using a process color printing technique and an under color removal technique; and means responsive to said black text edge control signal for selecting said under color removal technique.

11. Apparatus for detecting edges of black text in an original image, said apparatus comprising:

A. input means for providing a digital signal representative of an original image;

B. an edge detector having:

a) edge blurring means for sequentially low pass filtering a provided digital signal to blur and widen any edges in the original image, b) means for high pass filtering the low pass filtered signal to produce a first output signal which represents the edges of the blurred original image, c) non-edge blurring means for high pass filtering the provided signal to produce a second output signal which represents the non-blurred edges in the original image, and d) means for combining the first and second output signals to create a first edge control signal that encompasses any edges in the original image;

C. a halftone area detector having:

a) means for identifying halftone areas of the original image by identifying those areas of the original image that contain dots, and b) means for creating a second edge control signal that excludes areas in the original image identified as containing dots;

D. means for discriminating between color pixels and neutral pixels in the provided signal to produce a neutral color signal that represents the non-color portions of the original image; and E. means for combining said first edge control signal, said second edge control signal, and said neutral color signal to create a black text edge control signal that encompasses edges in the original image not in an area that contains dots.

12. Apparatus for detecting edges of black text in an original image as defined in claim 11, wherein said halftone area detector further comprises:

means for identifying solid areas found near dots in the original image; and means for excluding from said second edge control signal, those areas in the original image that contain solid areas near dots.

13. A black edge detector as defined in claim 11 further comprising:

means for processing said digital signal with one of a plurality of image processing techniques, one of which is particularly suitable for processing text edges; and means responsive to said first and second edge control signals for selecting said one image processing technique.

14. A black edge detector as defined in claim 11 further comprising:

means for using said digital signal to print an image selectively using a process color printing technique and an under color removal technique; and means responsive to said neutral color signal for selecting said under color removal technique.

* * * * *